United States Patent [19]

Reynolds et al.

[11] Patent Number: 5,725,820
[45] Date of Patent: Mar. 10, 1998

[54] METHOD FOR FORMING A PACKAGE OF ADHESIVE MATERIAL IN A NON-TACKY MOLD

[75] Inventors: H. Neel Reynolds, Greenville; Kevin McInerney, Greer, both of S.C.

[73] Assignee: The Reynolds Company, Greenville, S.C.

[21] Appl. No.: 724,849

[22] Filed: Oct. 3, 1996

[51] Int. Cl.[6] .................... B29C 70/00; B29C 39/10
[52] U.S. Cl. .................. 264/135; 53/410; 53/423; 264/255; 264/267
[58] Field of Search .................. 264/255, 135, 264/225, 269, 267; 53/410, 423, 561; 427/230; 118/DIG. 3

[56] References Cited

U.S. PATENT DOCUMENTS

| | | |
|---|---|---|
| 2,287,849 | 6/1942 | Wilson . |
| 2,496,609 | 2/1950 | Antwerpen . |
| 2,791,326 | 5/1957 | Sparks et al. . |
| 2,931,148 | 4/1960 | Smith . |
| 3,837,778 | 9/1974 | Parker . |
| 3,851,438 | 12/1974 | Brisman . |
| 4,088,727 | 5/1978 | Elliott . |
| 4,112,158 | 9/1978 | Creekmore et al. . |
| 4,135,033 | 1/1979 | Lawton . |
| 4,247,502 | 1/1981 | Loechell . |
| 4,306,657 | 12/1981 | Levy . |
| 4,318,475 | 3/1982 | Robinson . |
| 4,334,615 | 6/1982 | Butler et al. . |
| 4,450,962 | 5/1984 | Matthews et al. . |
| 4,514,446 | 4/1985 | Kadono et al. . |
| 4,755,245 | 7/1988 | Viel . |
| 5,110,641 | 5/1992 | Kean . |
| 5,112,552 | 5/1992 | Wittmann et al. . |
| 5,257,491 | 11/1993 | Rouyer et al. . |
| 5,292,468 | 3/1994 | Colombani . |
| 5,373,682 | 12/1994 | Hatfield et al. . |
| 5,401,455 | 3/1995 | Hatfield et al. . |

FOREIGN PATENT DOCUMENTS

| | | |
|---|---|---|
| 2544654 | 8/1984 | France . |
| 2248046 | 4/1974 | Germany . |
| 3234065 | 4/1983 | Germany . |
| 3138222 | 5/1983 | Germany . |
| 3625358 | 2/1988 | Germany . |

Primary Examiner—Jan H. Silbaugh
Assistant Examiner—Edmund H. Lee
Attorney, Agent, or Firm—Dority & Manning

[57] ABSTRACT

A process for forming a package of hot melt adhesive material includes forming a bottom layer of molten non-tacky polymeric material in a container and depositing a bead of molten non-tacky polymeric material along the top edges of an open-faced rigid container and allowing the bead of polymeric material to pour down the walls of the rigid container by gravity so as to coat the inside wall surfaces and bottom surface of the container with a substantially uniform layer of the non-tacky polymeric material. The layer of non-tacky polymeric material is allowed to solidify in the container and form a substantially rigid mold of the polymeric material within the container. The mold is located in a rigid support structure and is conveyed to a molten adhesive filling station. The mold is filled at the filling station with a metered amount of molten adhesive which is allowed to cool and solidify within the mold thereby forming a solidified package of hot melt adhesive material.

15 Claims, 5 Drawing Sheets

5,725,820

METHOD FOR FORMING A PACKAGE OF ADHESIVE MATERIAL IN A NON-TACKY MOLD

BACKGROUND OF THE INVENTION

The present invention relates to a method or process for forming packages of hot melt adhesive material, and particularly to a process for forming packages of hot melt adhesive material poured in a non-tacky polymeric material mold.

Hot melt adhesives are widely known in the industry and are generally provided in the form of cakes or blocks of the adhesive material. In end use, the blocks of adhesive are deposited in a hopper and heated to their molten state for subsequent application.

Due to the nature of the adhesives, the solid blocks of adhesive are tacky to the touch, particularly the pressure sensitive hot melt adhesives. Accordingly, there are a number of problems associated with handling and packaging of the solid blocks of adhesives.

Various attempts have been made in the art to package the tacky adhesives in non-tacky polymeric or thermofusible materials, particularly materials that are compatible with the adhesive composition. For example, U.S. Pat. No. 5,257,491 describes a method for packaging substantially solidified portions of adhesive material by surrounding the solidified portions with a plastic packaging material which is meltable together with the adhesive composition. Preferably, the packaging material is a net, wrap, sack, or a bag.

U.S. Pat. No. 5,401,455 describes a process for packaging hot melt adhesives including the steps of lining a container or mold with a thermoplastic film which is meltable together with the adhesive composition and blendable into the molten adhesive composition. Molten hot melt adhesive is then poured into the mold and the hot melt adhesive is allowed to solidify within the mold. The thermoplastic film disclosed in the '455 patent can be any film which is meltable together with the adhesive composition, including ethylene based polymers.

U.S. Pat. No. 5,112,552 discloses a process for forming packages of thermofusible autoadhesives including spraying the walls and bottom surfaces of a mold with a non-autoadhesive substance in the molten state. The molten autoadhesive is then poured into the mold and the free upper surface of the autoadhesive is then sprayed with the non-autoadhesive thermofusible material.

U.S. Pat. No. 5,292,468 also discloses a process for coating molds for the adhesive material with spinning fiberization nozzles which discharge a melted monofilament material in a circular pattern on the mold surfaces.

The known methods for packaging solid blocks of tacky hot melt adhesive have provided some degree of improvement in the packaging and handling of the adhesives. They have, however, also proven to be problematic in certain regards. For example, the known processes of spraying the mold surfaces with conventional spraying equipment presents a number of problems. It is relatively difficult to achieve a well-defined spray line or edge within the mold with the spray equipment and a significant portion of the molten material is wasted if the spray pattern is directed to the very top edge of the mold in order to take full advantage of the volume of the mold. It is also relatively difficult to ensure a uniformly thick coating of the protective material with the spraying apparatus. The '468 patent describes an improvement over the known spraying process, such as the process described in the '552 patent, but required relatively sophisticated and expensive machinery.

The present invention provides a relatively simple yet effective process for pre-coating the containers with a protective non-tacky material or forming molds into which molten adhesive is poured while eliminating many of the drawbacks and disadvantages of the known prior art methods.

OBJECTS AND SUMMARY OF THE INVENTION

It is therefore a principle object of the present invention to provide an improved method and process for forming blocks of hot melt adhesive having a protective non-tacky outer covering.

A further object of the present invention is to provide an improved method for coating containers into which are poured molten hot melt adhesive composition.

It is also an object of the present invention to provide packages of hot melt adhesive composition encapsulated in a non-tacky polymeric mold.

Still a further object of the invention is to provide a process for forming molds of a polymeric non-tacky material which can be easily stored as inventory as subsequently filled with molten adhesive material.

Additional objects and advantages of the invention will be set forth in part in the following description, or may be obvious from the description, or may be learned through practice of the invention.

In accordance with the objects and purposes of the invention, a process is provided for forming packages of hot melt adhesive material. The process includes the steps extruding a pattern of lines of molten non-tacky polymeric material onto the bottom surface of an open-faced rigid container and allowing the lines to merge into a uniform even bottom layer. The process further includes depositing a substantially continuous bead or line of molten non-tacky polymeric material at a predetermined height along the inside wall surfaces of the open-faced rigid container. The container can have any conventional shape and is preferably formed of a coated metal.

The process includes allowing the bead of non-tacky polymeric material to pour or cascade down the walls of the rigid container by gravity and to collect on the bottom surface of the container. In this manner, the non-tacky polymeric material adheres to the inside wall surfaces of the container and thereby coats the inside walls and bottom surface of the container with a substantially uniform layer of the non-tacky polymeric material.

The process further includes allowing the layer of non-tacky polymeric material to cool and solidify in the container thereby forming a substantially rigid mold of the non-tacky material within the container. At some later point in time, the molds of non-tacky polymeric material are located in rigid support structures, such as the pans in which the molds were originally formed or comparable structures, and conveyed to a molten adhesive filling station or device. The molds are filled at the filling device with metered amounts of molten adhesive. The molten adhesive is allowed to solidify within the molds thereby forming a solidified package of hot melt adhesive material encased at least on the bottom and sides in the layer of non-tacky polymeric material.

In a preferred embodiment of the process, the molds are removed from the rigid containers after they have formed and are stored as inventory for subsequent use. When the molds are needed, they are removed from inventory and placed in a rigid support structure for conveying to the filling station. The support structure in this case may comprise the same containers in which the molds were formed, or other comparable structures. For example, the support structure may comprise a plastic or metal sheet defining a series of receptacles for the polymeric material molds.

In an alternative embodiment of the process, the molds are maintained in the container in which they were formed and conveyed within this container directly to the filling device.

According to the present inventive process, the height and edge of the polymeric material molds can be precisely defined by the height at which the bead of molten polymeric material is applied onto the wall surfaces of the rigid container. In a preferred embodiment, the bead of molten material is applied generally at the top of the container walls and allowed to pour or cascade down the entire wall surface.

In an automated version of the preferred process, carried out in a substantially automated conveying line, the depositing step includes applying a metered and substantially continuous line or bead of the polymeric material with a programmable automatic extruding machine. The extruding machine is programmed to follow the shape of the open face of the container and applies precisely the amount of molten material necessary to achieve a layer having a desired thickness on the walls and bottom of the container.

Once the molten adhesive material has cooled and solidified, it may be desired to also coat the top surface of the solidified adhesive with a layer of the non-tacky polymeric material. This top layer can be applied by any conventional means. For example, the top layer can be sprayed on, or can be laid down or extruded in a pattern of lines of the material which flow or merge together to form a relatively continuous and uniform top layer. Once the top layer has solidified thus Completely encapsulating the adhesive material, the entire package is removed from the supporting structure and readied for subsequent packaging and shipping.

The accompanying drawings, which are incorporated in and constitute a part of this specification, illustrate embodiments of the invention and, together with the description, serve to explain the principles of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention cover such modifications and variations as come within the scope of the appended claims and their equivalents.

Figure 10:
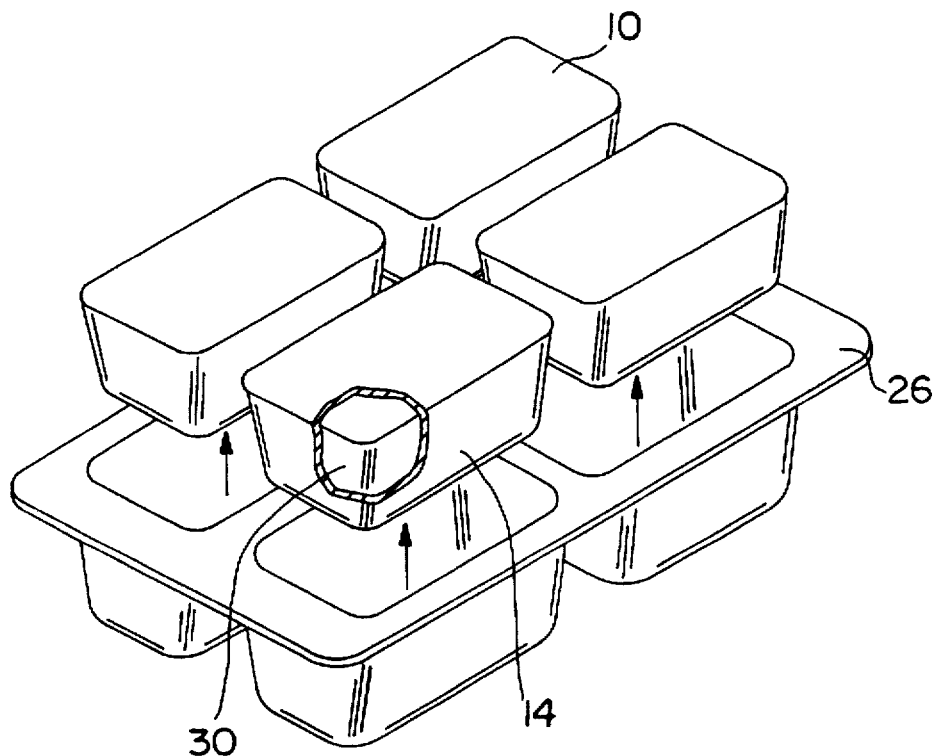
FIG. 10 is a perspective view of the completely encapsulated adhesive packages being removed from the supporting structure.

The method of the present invention relates to forming packages of hot melt adhesive material. Referring to FIG. 10, packages 10 are generally formed as blocks or cakes of the adhesive material. The hot melt adhesives possess a tacky or sticky surface characteristic in their solid state and it is generally desired to coat the adhesive material to prevent the adhesives from becoming fouled with foreign matter or sticking to each other.

It should be understood that the present invention is not limited to any particular type of hot melt adhesive, and includes any variety of polymerized materials blended with other ingredients such as a plasticizer, tackifier, extender, etc., to form the adhesive. The present inventive process is particularly useful in forming and packaging thermoplastic pressure sensitive adhesives. For example, the method disclosed and claimed herein may be used to package and form hot melt adhesives prepared from polymers and co-polymers of synthetic resins, rubbers, polyethylene, polypropolene, polyeurathane, acrylics, vinyl acetate, ethylene vinyl acetate, adhesives based on natural or synthetic adhesive resins, rosin, and esters of rosins, petroleum resins, etc.

Although the hot melt adhesives have been conventionally provided in the form of blocks, cakes, or the like, it should also be understood that the present inventive method is not limited to any particular shape or configuration of the adhesive package.

The present inventive method also relates to forming a mold of a non-tacky polymeric material into which the hot melt adhesive is poured in its molten state, as will be described in more detail below. The invention is not particularly limited to a specific polymeric material for forming the mold. It is preferred that the polymeric material be compatible with the hot melt adhesive so that the entire package, including the mold, can be melted in a melt pot for subsequent use of the adhesive without adversely affecting the adhesive composition. In a preferred embodiment, the non-tacky polymeric material is a wax, eva, or rubber compound, such as the polyethylene wax by Eastman Chemical Company known as EPOLENE™. It should be understood, however, that any conventional composition, or combination of such compositions, can be utilized in the present invention as the non-tacky polymeric material, including waxes, paraffins, thermofusible polymers and co-polymers of ethylene vinyl acetate, natural rubbers, synthetic elastomers, and all compositions or formulations of thermofusible hot melt adhesives in their non-autoadhesive form. It is preferred that the non-tacky polymeric material is as compatible with the adhesive composition as possible so as to form a complete and substantially homogeneous molten hot melt adhesive when the package is subsequently melted in a melt pot.

Referring to the figures in general, the present inventive method includes the step of first applying a pattern or series of lines of molten non-tacky polymeric material 14 onto bottom surface 20 of an open-faced rigid container 18. The molten material flows or merges together to form a uniform and even bottom layer 21 of the polymeric material. Any conventional apparatus, such as an extruding applicator, can be used to apply the molten material onto bottom surface 20.

Figure 2:
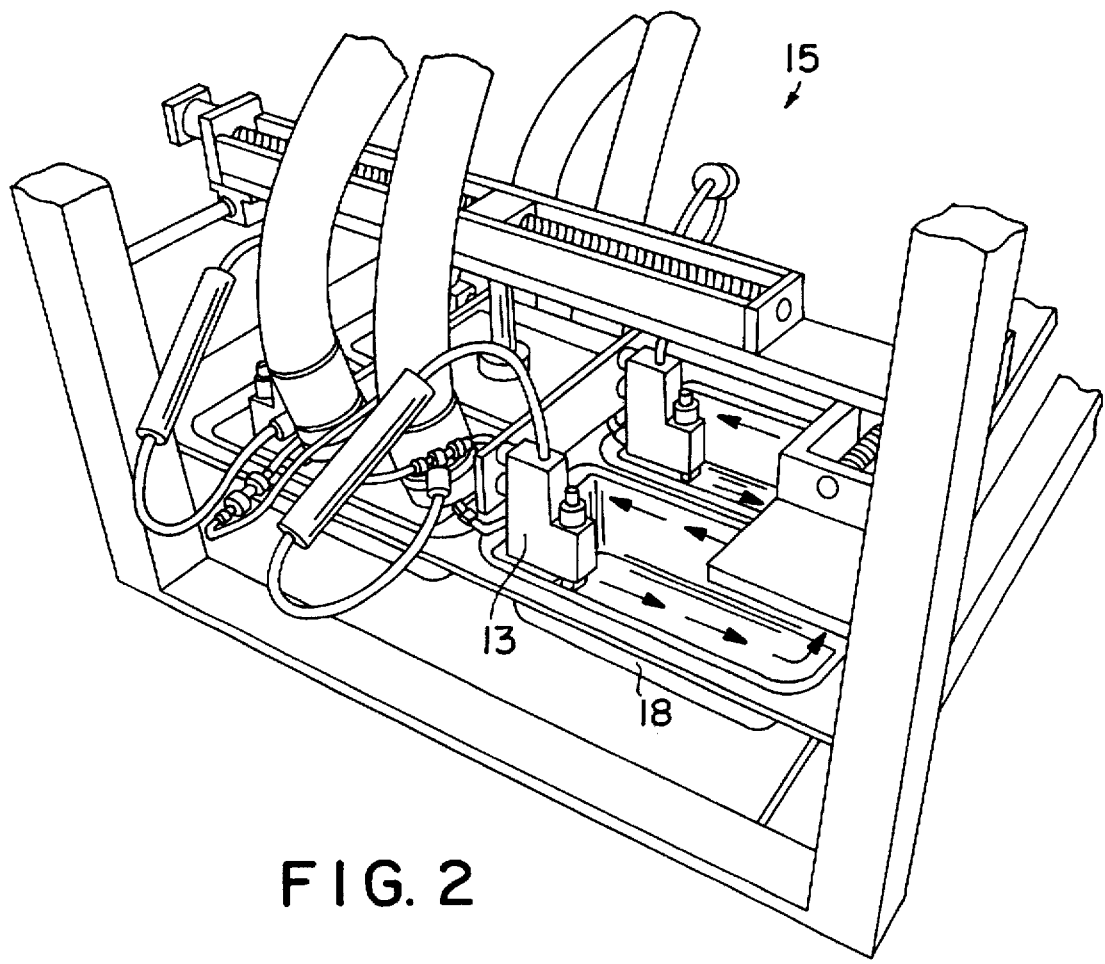
FIG. 2 is a perspective operational view of an applicating machine used to extrude the bead of molten non-tacky polymeric material onto the wall surfaces of the container.
Figure 3:
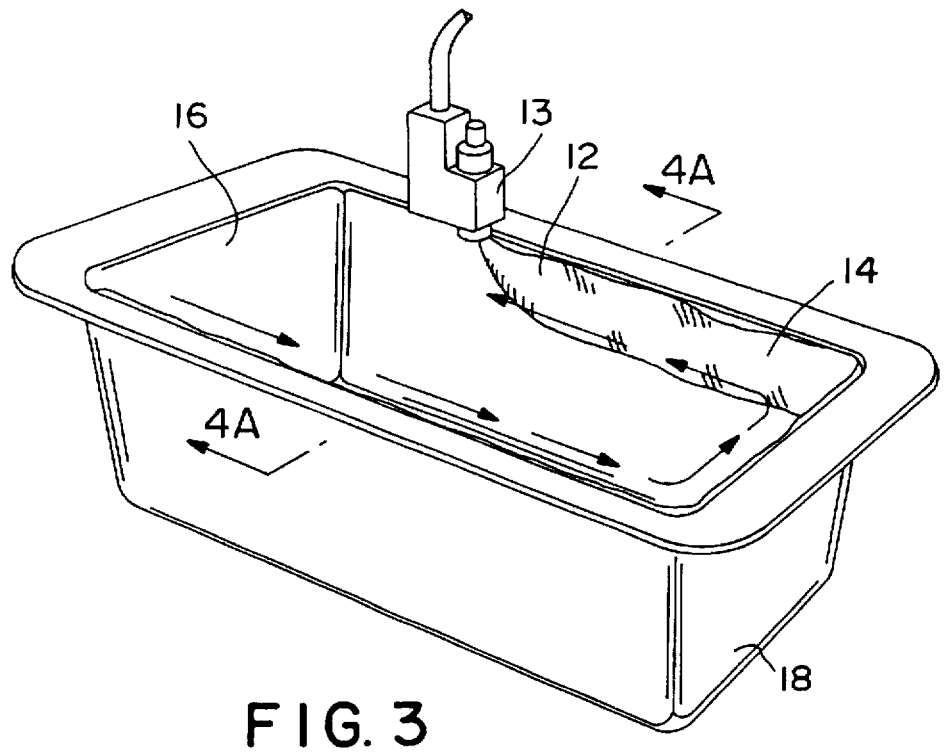
FIG. 3 is a close-up view of the bead of molten non-tacky polymeric material being applied to the top edges of the container.

Referring to FIGS. 2 and 3 in particular, the present inventive method includes the step of depositing a substantially continuous bead 12 of the molten non-tacky polymeric material 14 at a predetermined height along inside wall surfaces 16 of open-face rigid container 18. As illustrated in FIG. 3, container 18 can comprise a conventional metal or plastic container having any desired shape. In a preferred embodiment, container 18 is a truncated rectangular shape. The inside wall surfaces 16 and bottom surface 20 of container 18 may be treated with any conventional anti-friction coating or treatment, such as a silicone or teflon coating.

FIG. 2 illustrates a preferred device for carrying out the depositing step. The machine illustrated in FIG. 2 is a conventional hot melt applicator system, such as the STS 200 system by Crist Company of Norcross, Ga. This machine is a programmable extruder machine which extrudes or deposits a continuous bead of molten adhesive composition in a desired pattern. As seen in FIG. 2, the desired pattern is rectangular and the machine includes depositing heads 13 for depositing bead 12 of polymeric material 14 along the top edges of pan 18. In this manner, a precise metered amount of the molten polymeric material can be accurately deposited at any given or desired height of the pan. As illustrated in FIG. 3, bead 12 can be accurately deposited at the very top of the inner wall surfaces 16 so that the entire volume of the pan 18 can be utilized. If less than the entire volume of pan 18 is needed, the extruding heads 13 are simply reprogrammed to extrude the molten polymeric material at a lower height within container 18.

Figure 4A:
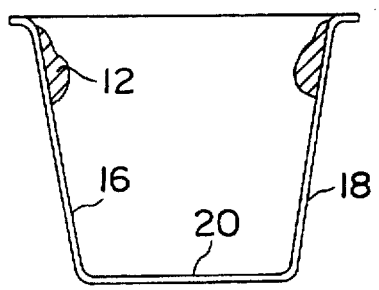
FIGS. 4a, 4b, and 4c are sequential views of the molten polymeric material cascading or pouring down the sides of the container and collecting on the bottom to form a uniform even coating of the polymeric material on the inner surfaces of the container.
Figure 4B:
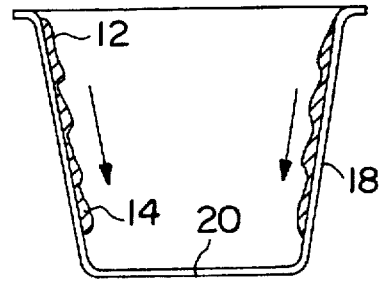
Figure 4C:
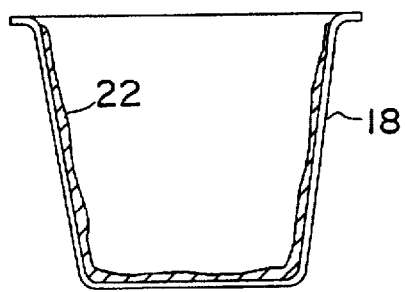

Referring particularly to FIGS. 4a through 4c, the bead 12 of polymeric material in its molten state is allowed to flow or cascade down the sides of container 18, as particularly illustrated in FIG. 4b. The molten polymeric material thus coats the entire side wall surfaces 16 and meets on the bottom surface layer 21. Thus, it should be understood, that a relatively uniform layer 22 of the molten polymeric material is thus applied to the inside wall surfaces 16, 20, with the layer 22 having a desired thickness.

It should be understood that the viscosity of the molten polymeric material 14 is controlled so that the layer 22 forms with a desired thickness. Applicants have found that an optimum viscosity range for a polyethylene wax material is between 4,000 and 10,000 cps at 325 degrees Fahrenheit. A preferred value is 5,700 cps at 325 degrees Fahrenheit. The surface tension of the bead 12 and the surface friction between the bead 12 and the inner wall surfaces 16 is such that the bead 12 does not simply fall or run into the bottom of container 18. The molten polymeric material adheres to the inner wall surfaces 16 as it pours or cascades towards bottom surface 20. Thus, it should be understood, that the eventual thickness of layer 22 of polymeric material applied to the inner wall surfaces 16 can be controlled through an empirical determination of desired viscosity, amount of material 14 extruded into the initial bead 12, as well as the coefficient of friction of the inner surfaces 16 of container 18. There must be some degree of adhesion of the molten polymeric material with the inner wall surfaces 16 to create the uniform layer 22 of non-tacky polymeric material. Applicants have found that a preferred thickness of layer 22 in its solidified state is from about 3–5 mm and from about 0.5% to 4.0% of the weight of the package.

Figure 5:
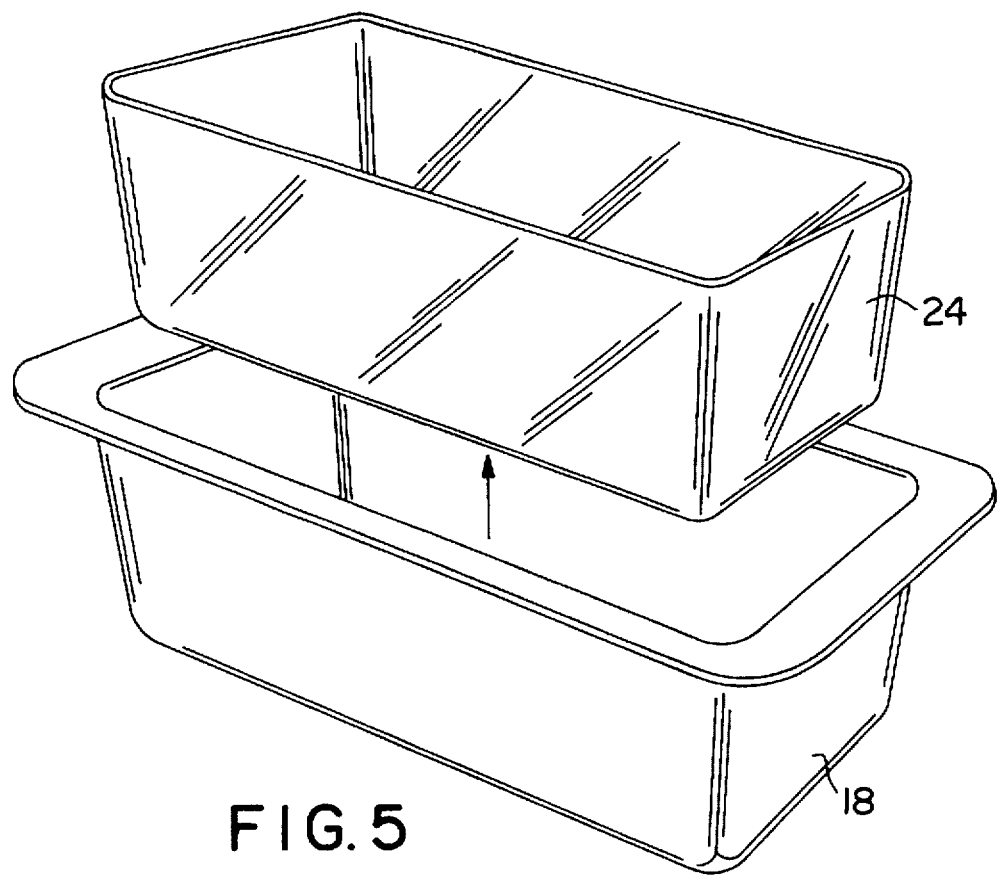
FIG. 5 is a perspective view of the polymeric material mold which is produced as a result of the molten polymeric material cooling in the containers.

The process also includes the step of allowing the layer 22 of non-tacky polymeric material to cool and solidify in container 18. As the material cools, it tends to constrict and withdraw from sides 16 of container 18. Once solidified, the non-tacky polymeric material forms a substantially rigid mold 24 having the same shape as container 18. As seen in FIG. 5, mold 24 has a particularly well defined upper edge, as determined by the height at which the initial bead 12 of polymeric material was deposited onto the wall surfaces of container 18.

Figure 6:
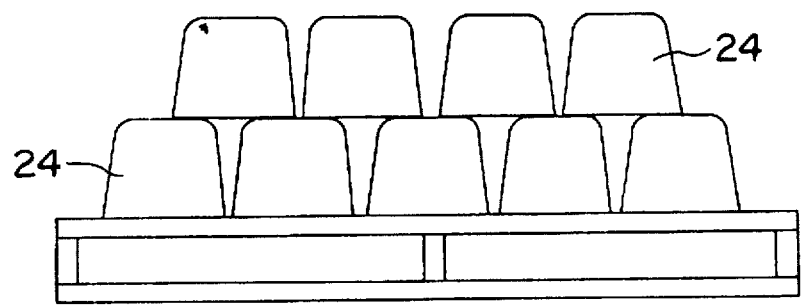
FIG. 6 is a perspective view of the polymeric molds being stored as inventory for subsequent use.

In one particularly preferred embodiment of the present inventive process, the non-tacky polymeric molds 24 are removed from containers 18 and an inventory of molds 24 can be readily maintained and depleted as necessary. Referring to FIG. 6, molds 24 have a sufficient rigidity so that they can be easily stacked and stored. Since molds 24 are formed from a non-tacky polymeric material, they can be stored indefinitely without the concern that the molds will pick up dirt or other foreign particulate matter. Additionally, the molds 24 will not stick or adhere to each other in their stored condition.

Figure 7:
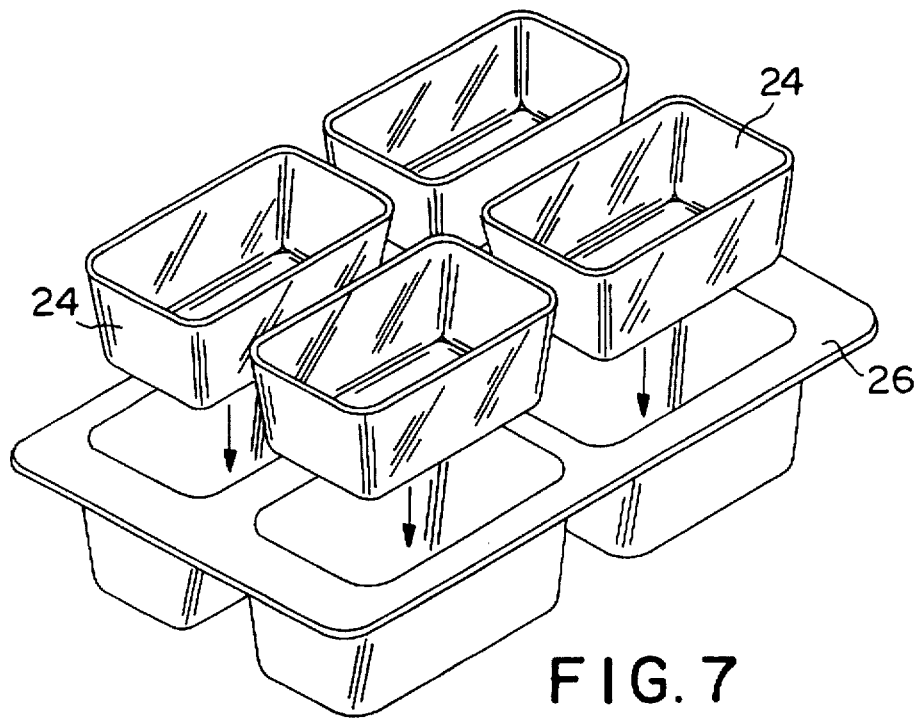
FIG. 7 is a perspective view of the polymeric molds being deposited in a supporting structure for subsequent conveyance to the molten adhesive filling station.

Referring to FIG. 7, the molds 24 are subsequently placed in a supporting structure 26 for subsequent filling with molten adhesive composition. Supporting structure 26 can be formed of any conventional material, such as steel or plastic. Structure 26 defines receptacles for molds 24 having the same general shape as molds 24. Structure 26 may comprise the identical containers 18 in which the molds were initially formed, or may comprise an integrally formed component defining a number of receptacles, such as the device illustrated in FIG. 7. It is also possible that molds 24 can be supported on a relatively flat support structure without the necessity of supporting the sides of molds 24 depending on the rigidity of the molds.

Figure 8:
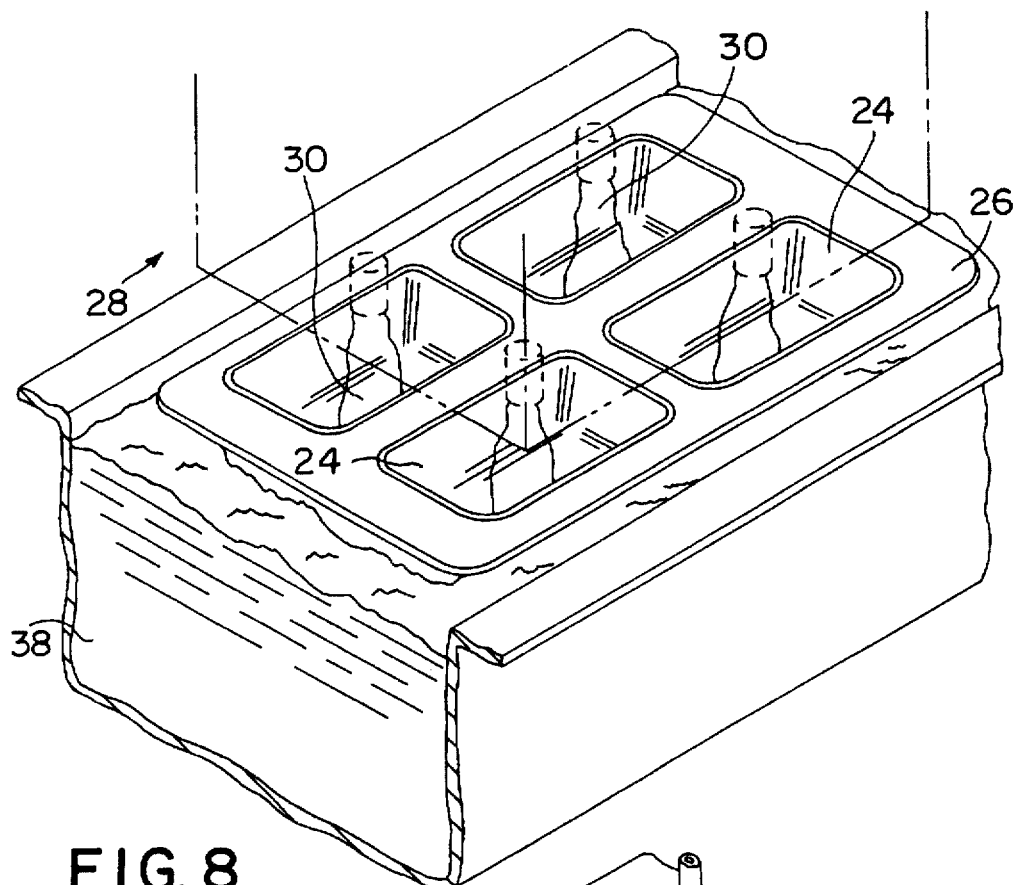
FIG. 8 is a perspective view of the supporting structure with polymeric molds floating in a water bath and being filled at the filling station with molten adhesive.

Supporting structure 26 with molds 24 are subsequently conveyed to a filling station or device 28 wherein molten adhesive 30 is poured into molds 24, as generally illustrated in FIG. 8. Structure 26 and molds 24 are maintained in a heat sink, such as water bath 38 illustrated in FIG. 8, during the pouring of the molten adhesive since the polymeric material of molds 24 may have very near the melting point of the molten adhesive. The heat sink or water bath 38 is necessary to convey heat away from molds 24 so that the molten adhesive 30 does not completely melt the molds. There will be some degree of melting and mixing of the polymeric material and molten adhesive at the interface between the two materials. However, it should be understood, that at least some degree of melting and mixing is actually beneficial in that it aids in a complete mixing of the polymeric material with the adhesive during subsequent melting and application of the adhesive. The outermost surface of mold 24 will, however, remain a continuous and homogeneous layer of the non-tacky polymeric material.

Figure 1:
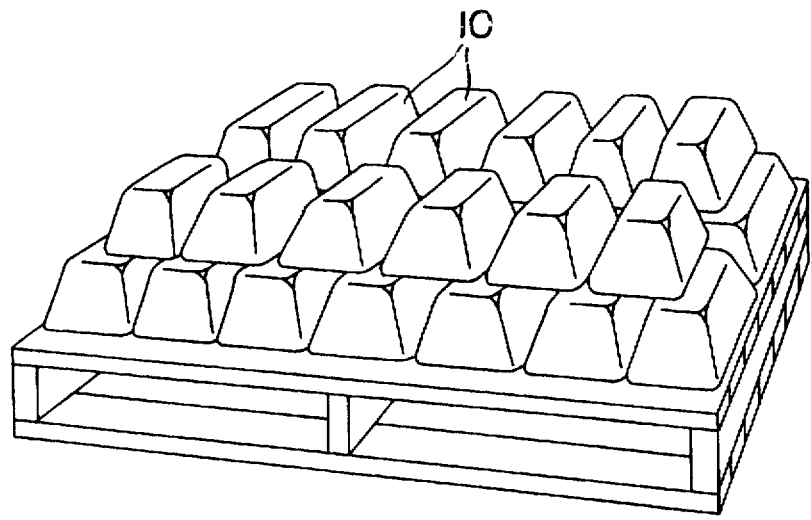
FIG. 1 is a perspective operational view of the formation of a layer of non-tacky polymeric material onto the bottom surface of a pan or container.
Figure 9:
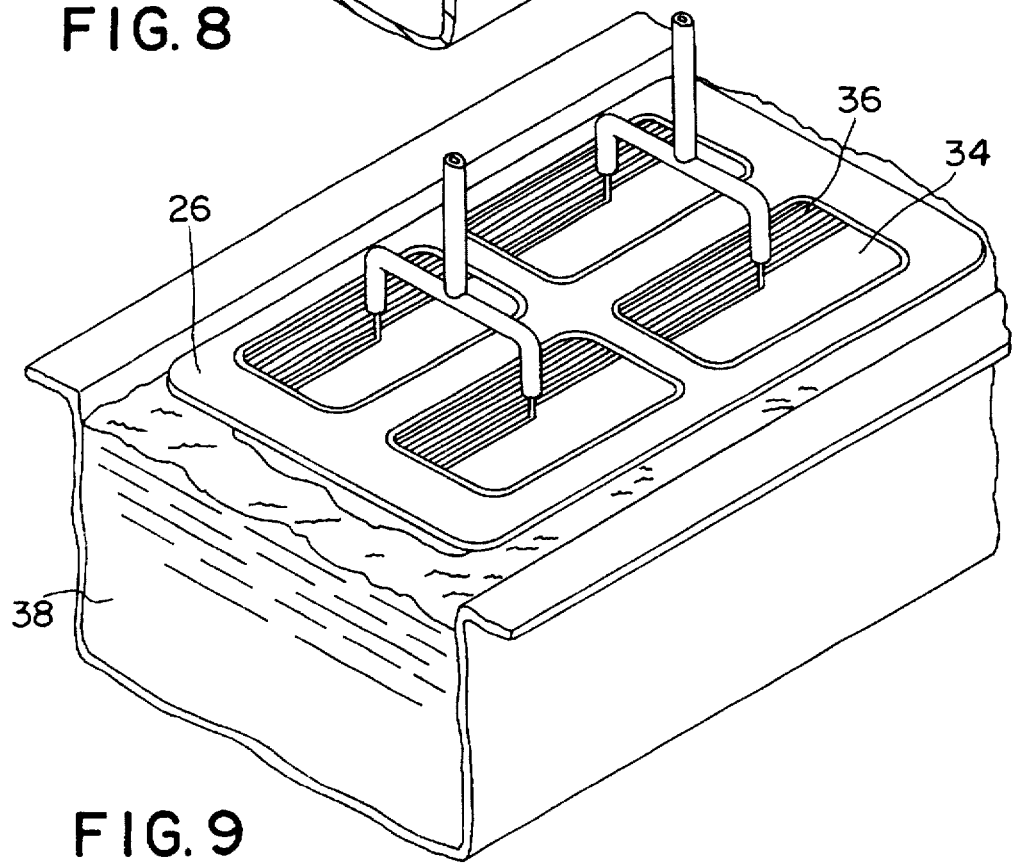
FIG. 9 is a perspective view of the process of applying the non-tacky polymeric material to the top surface of the adhesive package in a pattern of adjacent lines.

The molds and molten adhesive are allowed to cool until the molten adhesive solidifies within molds 24. At this point, it may be preferred to also coat top surface 34 of the adhesive block with a layer of the non-tacky polymeric material. This top layer may be applied by any conventional means. FIG. 9 illustrates an embodiment wherein the top layer is applied in a series of extruded lines 36 of the polymeric material similar to application of bottom layer 21 shown in FIG. 1. The lines 36 will flow or merge together to form a generally uniform and even layer of the material. In an alternative embodiment, a top layer can be pre-formed, for example by die cutting, and simply placed on the top surface of the adhesive material.

Once the top layer of polymeric material is solidified, the package 10 can be removed from structure 26. At this point, the package 10 is completely encapsulated within the mold of polymeric material. The packages 10 can then be subsequently stacked or packaged for shipping without a concern that the adhesive will become contaminated with foreign particulate matter or that the packages 10 will adhere to each other.

It should be understood by those skilled in this art that various modifications and variations can be made in the present inventive process without departing from the scope or spirit of the invention. For example, any manner of conventional devices can be utilized to apply the initial bead of molten non-tacky polymeric material to containers 18. Alternatively, the bead can also be applied by hand. Likewise, any combination of factors of viscosity, surface friction of container 18, slope of the vertically extending side walls of the container, etc., can be manipulated to control the thickness of the layer of polymeric material deposited on the inner walls of the container. It is intended that the present invention cover such modifications and variations as come within the scope of the appended claims and their equivalents.

What is claimed is:

1. A process for forming a package of hot melt adhesive material, said process comprising:

forming a bottom surface layer of molten non-tacky polymeric material onto a bottom surface of an open faced rigid container;

depositing a substantially continuous bead of molten non-tacky polymeric material at a predetermined height along inside wall surfaces of the open faced rigid container;

allowing the bead of non-tacky polymeric material to move down said inside wall surfaces by gravity and meet said bottom surface layer of non-tacky polymeric material in the container, the non-tacky polymeric material adhering to and thereby coating said inside wall surfaces and bottom surface with a substantially uniform layer of the non-tacky polymeric material;

allowing the layer of non-tacky polymeric material to solidify in the container thereby forming a substantially rigid mold of the non-tacky polymeric material within the container;

locating the mold of non-tacky polymeric material in a rigid support structure and conveying the mold to a molten adhesive filling device; and filling the mold at the filling device with a metered amount of molten adhesive and allowing the molten adhesive to solidify within the mold thereby forming a solidified package of hot melt adhesive material encased at least on the bottom and sides in the layer of non-tacky polymeric material.

2. The process as in claim 1, wherein said depositing a bead of molten non-tacky material step comprises applying a substantially continuous metered line of the non-tacky polymeric material generally at the top of the inside wall surfaces.

3. The process as in claim 1, further comprising maintaining the molten non-tacky polymeric material at a temperature and viscosity known to form a desired layer thickness of the non-tacky polymeric material on the inside wall surfaces and bottom surface of the container.

4. The process as in claim 1, wherein said depositing step comprises applying a metered substantially continuous amount of the polymeric material with a programmable extruding machine.

5. The process as in claim 1, further comprising removing the mold of non-tacky polymeric material from the container and storing the mold in inventory prior to said locating step.

6. The process as in claim 5, wherein said locating step comprising removing the mold from inventory as needed and placing the mold in the rigid support structure.

7. The process as in claim 6, further comprising placing the mold in a receptacle defined in the rigid support structure having essentially the same shape as the mold.

8. The process as in claim 1, wherein said locating step comprises keeping the mold in said open faced rigid container in which it was formed and conveying said open faced rigid container to the filling device.

9. The process as in claim 1, further comprising cooling the mold in a heat sink to solidify the molten adhesive.

10. The process as in claim 1, wherein said forming a bottom layer step comprises applying a pattern of lines of molten non-tacky polymeric material onto the bottom surface and allowing the lines to flow into a substantially continuous and uniform bottom layer of non-tacky polymeric material.

11. The process as in claim 1, further comprising applying a top layer of the non-tacky polymeric material to a top surface of the solidified package of adhesive material so as to completely encapsulate the package.

12. The process as in claim 11, wherein said applying the top layer comprises laying down a pattern of lines of the non-tacky polymeric material on the top surface of the solidified package of adhesive material and allowing the lines to flow and merge into a substantially continuous and uniform top layer.

13. The process as in claim 1, wherein the non-tacky polymeric material is compatible with the adhesive material.

14. The process as in claim 1, wherein said process steps are carried out in a substantially automated conveying line.

15. A process for forming packages of hot melt adhesive material, said process comprising:

depositing with an automated extruding machine a pattern of lines of molten non-tacky polymeric material onto a bottom surface of an open faced container and allowing the lines of molten material to flow and merge into a substantially continuous and uniform bottom layer;

depositing with an automated extruding machine a substantially continuous bead of molten non-tacky polymeric material at a predetermined height along inside wall surfaces of the open faced container;

allowing the bead of non-tacky polymeric material to move down the inside wall surfaces by gravity and meet the bottom layer of polymeric material in the container, the non-tacky polymeric material adhering to the inside wall surfaces and thereby coating the inside wall surfaces and bottom surface with a substantially uniform layer of the non-tacky polymeric material;

allowing the layer of non-tacky polymeric material to solidify in the container thereby forming a substantially rigid mold of the non-tacky polymeric material within the container;

removing the mold from the container and storing the mold in an inventory of molds;

removing the mold from inventory as needed and locating the mold in a rigid support structure;

conveying the support structure and mold to a molten adhesive filling device and depositing a metered amount of molten adhesive into the mold;

cooling the mold in a cooling bath to allow the molten adhesive to solidify within the mold; and depositing a layer of the non-tacky polymeric material onto the top surface of the solidified adhesive so as to completely encapsulate the adhesive.

* * * * *